March 3, 1959     J. B. EVANS     2,875,787
PULSATION DAMPENER DEVICE
Filed March 27, 1956
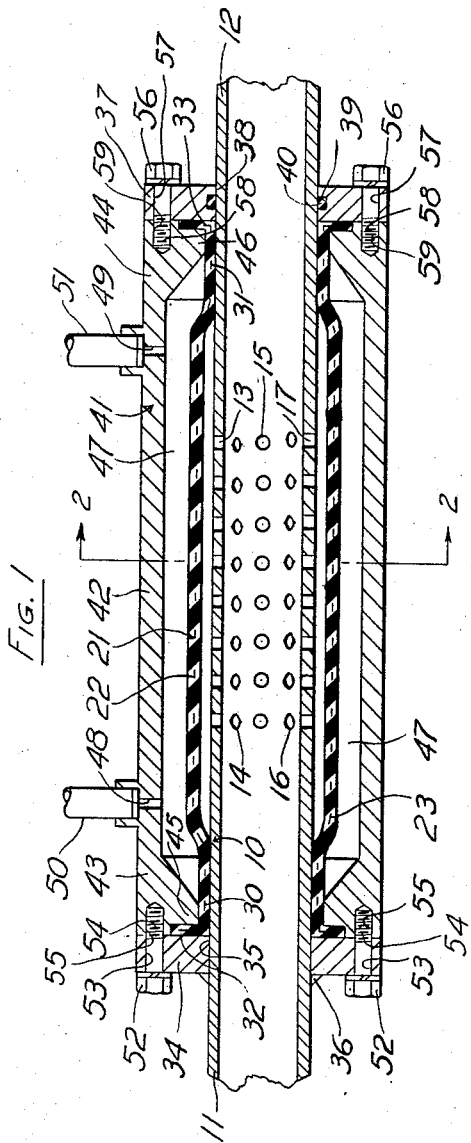
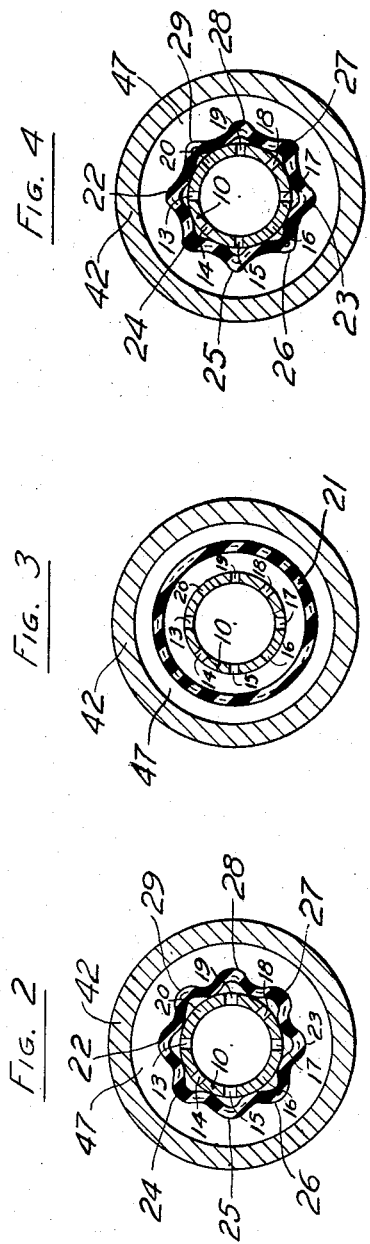
INVENTOR.
John B. Evans
BY
Adelbert A. Steinmiller
ATTORNEY United States Patent Office 2,875,787
Patented Mar. 3, 1959

2,875,787

PULSATION DAMPENER DEVICE

John B. Evans, Irwin, Pa., assignor to Westinghouse Air Brake Company, Wilmerding, Pa., a corporation of Pennsylvania Application March 27, 1956, Serial No. 574,234

1 Claim. (Cl. 138—30)

This invention relates to devices for dampening, absorbing, or suppressing undesired pressure pulsations or surges in fluid systems, and more particularly to such devices of the type employing resilient means adapted to change its position to accommodate temporary increases in a fluid volume resulting from momentary surges and pulsations.

As is well known in the art to which the invention relates, pulsations and surges which the apparatus of the instant invention is designed to dampen and suppress originate in fluid systems in a number of ways. A reciprocating pump has an output which is usually characterized by low cycle or low frequency surges of high volume or intensity. Centrifugal and rotary pumps may have in their fluid outputs low volume surges occurring at a high frequency. In addition to these periodic surges, shock waves may be generated in any fluid flow system where the fluid is subject to sudden deceleration, such for example as that caused by closing a valve against a moving column of fluid. The closing of such a valve may result in the generation of surges or shock waves of high intensity which may produce damaged pipe lines and undesirable noises frequently known as "water hammer."

It is old in the art to suppress and dampen these surges and shock waves by connecting in the fluid line a mandrel or section of pipe having therein a number of perforations or throttling orifices, this perforated section of pipe or mandrel being surrounded by a resilient sleeve of rubber or other suitable resilient material. Sudden increases of pressure in the fluid in the line cause the fluid to flow through the perforations into the space between the sleeve and the line or mandrel thereby taking up or absorbing the excess pressure. When the pressure in the line returns to normal, the fluid between the sleeve and the line is discharged through the openings or perforations back into the line. In some prior art devices the sleeve itself is surrounded by a housing which forms a chamber containing resilient material, such, for example, as air under pressure, to insure the rapid collapse of the sleeve or return to its former position, and discharge of fluid back into the line, when the line pressure falls to normal or below after the surge has passed.

It has been found that the useful life of resilient sleeves in such devices is limited by the wear resulting from contact and friction between the sleeve and pipe section, particularly when the sleeve collapses against the pipe, and also to some extent when the sleeve is distended by fluid pressure in the line and may make contact with the walls of the surrounding chamber.

Furthermore, the sleeve may be stretched beyond its limit of elasticity by the fluid intake during the surge so that the sleeve does not return to normal, or its former position, when the pressure decreases, and with the further result that undesired stresses and strains occur in the material of which the sleeve is composed, reducing its effectiveness as a surge absorbing element and possibly resulting in its ultimate rupture. Also, undesired sharp folds and creases in the sleeve may occur when it collapses after the surge has passed.

The apparatus of the instant invention is adapted to reduce to a minimum wear of the sleeve resulting from frictional contact between the sleeve and the supporting mandrel or perforated pipe section, and is also adapted to prevent the occurrence of sharp folds and creases in the sleeve which might result in damage to the sleeve. These objectives are accomplished by providing the sleeve with a number of corrugations running lengthwise of the sleeve. The sleeve may be molded into the corrugated shape. The sleeve is capable of expansion from its normal position by causing the corrugations to be stretched out, the outside surface of the sleeve becoming substantially cylindrical. This form of expansion of the sleeve will have a minimum stressing effect upon the material composing the sleeve. In the preferred embodiment of the invention shown, one or more layers of reinforcing material such as knitted, woven, or braided cotton or synthetic fiber are used inside the sleeve, and this layer of reinforcing material prevents the sleeve from being stretched beyond its limit of elasticity. The corrugations reform and the sleeve collapses along the corrugations parallel to the longitudinal axis when the excess pressure in the sleeve disappears.

Accordingly, it is a primary object of this invention to provide new and improved surge absorbing and pulsation dampening apparatus characterized by long and trouble-free life.

Another object is to provide surge absorbing and pulsation dampening apparatus characterized by substantially constant high efficiency over its entire lifetime.

Another object is to provide new and improved surge absorbing apparatus of the type employing a resilient sleeve, in which wear of the sleeve is reduced to a minimum.

Another object is to provide new and improved surge absorbing apparatus of the type employing a resilient sleeve supported by a mandrel in which contact between the sleeve and mandrel is reduced to a minimum.

Still another object is to provide new and improved surge absorbing apparatus of the type employing a resilient sleeve supported by a mandrel in which the volume between the sleeve and mandrel may vary within wide limits without stretching the sleeve beyond its limit of elasticity.

Still a further object is to provide new and improved surge absorbing apparatus employing a resilient sleeve having corrugations running lengthwise of the sleeve to reduce contact between the sleeve and supporting mandrel.

Other objects and advantages will become apparent after a perusal of the following specification when studied in connection with the accompanying drawings, in which:

Fig. 1 is a cross-sectional view of the preferred embodiment of the pulsation dampener apparatus, taken substantially along the longitudinal axis thereof;

Fig. 2 is a cross-sectional view taken along the line 2—2 of Fig. 1;

Fig. 3 is a cross-sectional view in the same plane as that of Fig. 2 but showing the resilient sleeve in a fully expanded condition where the volume between the sleeve and mandrel or perforated pipe section is at a maximum; and Fig. 4 is a cross-sectional view in the same plane as that of Fig. 2, showing the sleeve in a fully collapsed position at a moment when the pressure in the line is undergoing a rarefaction, or drop below normal, after the surge has passed.

Referring now to the drawings for a more detailed understanding of the invention, and in which like reference numerals are used throughout to designate like parts, there is shown a mandrel or perforated pipe section generally designated by the reference numeral 10, having a centrally located perforated portion and end portions 11 and 12, which it is to be understood, are coupled by any convenient means, not shown, into the line carrying the fluid from which pulsations and surges are to be removed. The ends 11 and 12 may be threaded, if desired, for use with conventional pipe couplings.

Whereas for convenience of illustration only the embodiment of the invention is shown in which fluid flows through the device, it is to be understood that one end of the apparatus could be closed as by a plug, cap or any other convenient means, and the other end connected to the fluid line by, for example, a T-joint.

The perforated portion of the pipe section 10 contains a plurality of rows of throttling orifices, five of the rows being shown in Fig. 1 and designated by the reference numerals 13, 14, 15, 16 and 17. Three additional rows of throttling orifices 18, 19 and 20 are shown in Fig. 2.

Disposed around the perforated portion of the pipe section 10 and extending in both directions from the perforated portion is a resilient sleeve generally designated 21, which may be made of rubber or other suitable resilient material, and which preferably has at least one layer of reinforcing fiber or fabric therein. This fabric may be omitted where it is contemplated that the sleeve will be used under pressure conditions which will not expand the sleeve excessively or beyond its limit of elasticity as determined by the material of which the sleeve is composed. The sleeve 21 has in the central portion thereof a plurality of corrugations which extend lengthwise of the sleeve, two of the corrugations being shown at 22 and 23 in Fig. 1, six other corrugations being shown at 24, 25, 26, 27, 28 and 29, Fig. 2. It should be noted that the corrugations are so disposed with respect to the rows of throttling orifices in the pipe section that the dips between the corrugations, or the portions of smallest diameter, are normally in loosely abutting relationship with those portions of the outside surface of the pipe section which lie between the rows of throttling orifices. The sleeve 21 is seen, Fig. 1, to have end portions which are uncorrugated, the end portions being designated 30 and 31, and to have outwardly extending flanges 32 and 33 which are provided for purposes to be hereinafter more clearly apparent.

Whereas an embodiment of the invention has been shown and described in which the perforated pipe section is provided with eight rows of throttling orifices, and the resilient sleeve is provided with eight corrugations running lengthwise of the sleeve, it is to be understood that the invention is not to be limited to any particular number of rows of orifices, nor to any particular number of corrugations, but that any convenient number of either could be employed. Whereas throttling orifices which are substantially circular in shape have been shown, it is to be understood that the invention is not to be limited to throttling orifices of circular shape but that any desired shape could be employed.

Particular reference should be made now to Fig. 1 in which there is shown an end plate or end disc 34 having a bore 35 therein for receiving the end 11 of pipe section 10, and which is secured thereto as by welding at 36. Disposed on the other end 12 of pipe section 10 is a second end plate or end disc 37 having a large bore 38 therein for fitting snugly around the end 12 of the pipe section and a groove 39 therein for receiving a sealing ring 40. The end plates 34 and 37 are so positioned on the perforated pipe section 10 that they fit snugly against the flanges 32 and 33 of the aforementioned resilient sleeve 21.

Disposed around the sleeve 21 and spaced therefrom is a casing or housing generally designated by the reference numeral 41, the housing 41 having a cylindrical wall portion 42 with two inwardly extending flanged end portions 43 and 44, end portions 43 and 44 having annular lips 45 and 46 respectively. The lip 45 is adapted to catch, hold, and compress the flange 32 of sleeve 21, while the lip portion 46 is adapted to catch, hold, and compress the flange 33 of sleeve 21, thereby providing sealed engagement with the sleeve and forming a sealed chamber 47 within the housing 41 between the wall 42 thereof and the sleeve 21. It should be noted that the wall 42 has a pair of bores or apertures 48 and 49 therein, which are connected to pipes 50 and 51 respectively, pipe 50 being connected to a pressure gauge, not shown, and pipe 51 being connected by way of a valve, not shown, to a source of compressed air, not shown, for admitting compressed air into the chamber 47, the compressed air in chamber 47 assisting the sleeve 21 in opposing flow of fluid into the volume between the sleeve and pipe section 10 during surges of pressure, and further assisting the sleeve 21 in discharging fluid back from the enlarged volume through the throttling orifices into the line when the pressure falls to the normal or below after the surge has passed.

A number of bolts 52 peripherally spaced around the aforementioned end plate 34 pass through bores 53 in the end plate and have the threaded ends 54 thereof in engagement with threaded bores 55 in the aforementioned flange end 43 of housing 41. Similarly, a number of bolts 56 are peripherally spaced around the aforementioned end plate 37 and pass through bores 57 in the end plate 37, and have the threaded ends 58 thereof in threaded engagement with threaded bores 59 in the aforementioned flanged end 44 of housing 41.

In the operation of the above-described apparatus, the pulsation or surge dampener may be precharged prior to connecting in the fluid line by filling the chamber 47 with compressed air at a pressure selected in accordance with the anticipated normal pressure of the fluid in the line to which the pipe section 10 is to be connected. The pressure of compressed air in chamber 47 will force the resilient sleeve 21 inwardly into close contact with the outer surface of the pipe section 10, this position being shown in Fig. 4. It should be noted in Fig. 4 that the area of the internal surface of the sleeve 21 which makes contact with the surface of the pipe section 10 between the rows of throttling orifices is somewhat increased over the area making similar contact in Fig. 2. Assume now by way of illustration that the precharged dampener is connected in a fluid line. A certain amount of fluid from the line will flow through the rows of throttling orifices 13, 14, 15, 16, 17, 18, 19 and 20 into the volume between the line and the internal surface of the sleeve 21, and will force the corrugations 22, 23, 24, 25, 26, 27, 28 and 29 outwardly until they assume positions depending upon the strength of the opposing forces resulting from the pressures exerted inwardly and outwardly on the sleeve 21, and they may assume the positions shown in Fig. 2. Assume now by way of illustration that a surge of pressure occurs in the fluid in pipe section 10 so that the instantaneous pressure in the fluid attains a value considerably greater than the normal pressure. Fluid will flow through the throttling orifices into the volume between the mandrel or pipe section 10 and the sleeve 21, expanding the sleeve and removing the corrugations, so that the outer surface of the corrugated portion of the sleeve becomes substantially cylindrical and the sleeve may assume a fully expanded position in which it is substantially circular in cross section as shown in Fig. 3. Further expansion of the sleeve 21 may be prevented by the reinforcing fabric material used in the sleeve. After the surge of pressure has passed, the pressure of the compressed air in chamber 47 and the normal resiliency of the sleeve will cause the sleeve to contract. The preformed corrugations in the sleeve will control the contraction or collapse of the sleeve so that the corrugations will be reformed, and the sleeve may reassume the position shown in Fig. 2. Should the pressure in the line momentarily fall below normal after the surge has passed, such for example as a fall resulting from a pressure rarefaction, the sleeve may be compressed to a position such as that shown in Fig. 4, but the corrugations in the sleeve will control or define the collapse of the sleeve, will prevent the formation of sharp creases or folds in the sleeve, and will reduce to a minimum the portion of the sleeve making contact with the outer surface of the pipe section 10, thereby reducing the effects of friction on the sleeve.

It should be understood that any desired ratio may exist between the total area of the throttling orifices and the area of the passage through pipe section 10, no particular ratio of these areas forming a part of this invention.

Having now described the invention, what I claim as new and desire to secure by Letters Patent, is:

In a pulsation dampening and surge absorbing apparatus for use with a conduit carrying a fluid under variable pressure, the combination of a tubular mandrel having a plurality of throttling orifices therethrough and connectable to the conduit, casing means, corrugated resilient sleeve means surrounding said mandrel and comprising a plurality of corrugations of substantially uniform configuration arranged circumferentially about said mandrel and each extending longitudinally in a direction parallel to the axis of said mandrel, said sleeve means being sealingly secured adjacent its respective ends between the casing means and mandrel, said casing means providing a chamber surrounding the outer surface of said resilient sleeve means and charged with fluid at a preselected fluid pressure corresponding to the normal pressure of fluid in the conduit, the inner surface of said corrugated resilient sleeve means combining with the outer surface of said mandrel to define a variable volume constantly open to the conduit via said throttling orifices, the radially innermost surfaces of said corrugated resilient sleeve means normally lightly engaging the outer surface of said mandrel and the respective portions of said corrugated resilient sleeve means intermediate said radially innermost surfaces being normally spaced from said mandrel, said corrugated resilient sleeve means being responsive to a maximum surge-induced preponderance in fluid pressure in said volume over that in said chamber to substantially nullify said preponderance by flexing outwardly, without substantial stretching of the resilient material of which said resilient sleeve means is composed, to a fully expanded position in which said sleeve means becomes substantially cylindrical in shape and the then cylindrical outer surface of said sleeve means is spaced from said casing means, said resilient sleeve means being responsive to a decrease in fluid pressure in said volume below that in said chamber, after such surge has passed, to collapse in a predetermined pattern as determined by said corrugations for discharging fluid under pressure from said volume back into the conduit at the rate controlled by said throttling orifices.

References Cited in the file of this patent

UNITED STATES PATENTS

| | | |
|---|---|---|
| 2,260,850 | Brazier et al. | Oct. 28, 1941 |
| 2,609,001 | Hebard | Sept. 2, 1952 |

FOREIGN PATENTS

| | | |
|---|---|---|
| 842,835 | France | Mar. 13, 1935 |